United States Patent
Stephenson et al.

(10) Patent No.: US 9,467,010 B2
(45) Date of Patent: Oct. 11, 2016

(54) METHOD OF WINDING A STATOR CORE WITH A CONTINUOUS CONDUCTOR HAVING A RECTANGULAR CROSS-SECTION AND A STATOR CORE

(71) Applicant: REMY TECHNOLOGIES, L.L.C., Pendleton, IN (US)

(72) Inventors: Mark A. Stephenson, Fairland, IN (US); Kirk Neet, Pendleton, IN (US)

(73) Assignee: REMY TECHNOLOGIES, L.L.C., Pendleton, IN (US)

(*) Notice: Subject to any disclaimer, the term of this patent is extended or adjusted under 35 U.S.C. 154(b) by 314 days.

(21) Appl. No.: 14/301,989

(22) Filed: Jun. 11, 2014

(65) Prior Publication Data

US 2014/0292123 A1 Oct. 2, 2014

Related U.S. Application Data

(63) Continuation-in-part of application No. 13/298,813, filed on Nov. 17, 2011, now Pat. No. 8,789,259.

(51) Int. Cl.
H02K 1/00 (2006.01)
H02K 1/16 (2006.01)
(Continued)

(52) U.S. Cl.
CPC ...... *H02K 1/16* (2013.01); *H02K 1/20* (2013.01); *H02K 3/12* (2013.01); *H02K 15/066* (2013.01); *Y10T 29/49009* (2015.01)

(58) Field of Classification Search
CPC ..... H02K 3/28; H02K 3/12; Y10T 29/49009
USPC ............... 310/179–180, 184, 200–203, 208; 29/596
See application file for complete search history.

(56) References Cited

U.S. PATENT DOCUMENTS 3,496,394 A 2/1970 Balcke et al.
3,532,402 A 10/1970 Beery et al.
(Continued)

FOREIGN PATENT DOCUMENTS

EP 0923187 B1 2/2002
JP 1286755 A 11/1989
(Continued)

OTHER PUBLICATIONS

International Search Report and Written Opinion for corresponding PCT Application No. PCT/US05/31347, dated Sep. 26, 2007, pp. 1-13.

(Continued)

*Primary Examiner* — Thanh Lam
(74) *Attorney, Agent, or Firm* — Cantor Colburn LLP

(57) ABSTRACT

A method of inserting a continuous conductor having a rectangular cross-section into slot segments formed in a stator core includes forming a core member having a plurality of slot segments each having an opening and inserting a stator winding having a plurality of phases into select ones of the slot segments. Each of the plurality of phases has at least one conductor including a plurality of substantially straight segments alternately connected by a plurality of end loop segments. A section of the at least one conductor includes three consecutive end loop segments and three consecutive straight segments formed from a single continuous conductor. The method further includes narrowing the opening of each of the plurality of slot segments by forming an annular stator core having a central axis. The three consecutive straight segments are substantially similarly radially spaced from the central axis.

14 Claims, 9 Drawing Sheets

(51) Int. Cl.
   *H02K 1/20* (2006.01)
   *H02K 15/06* (2006.01)
   *H02K 3/12* (2006.01)

(56) References Cited

U.S. PATENT DOCUMENTS

| | | | |
|---|---|---|---|
| 4,228,210 A | 10/1980 | Scribner | |
| 4,429,927 A | 2/1984 | Kawabata | |
| 4,606,000 A | 8/1986 | Steele et al. | |
| 5,059,042 A | 10/1991 | Grierson | |
| 5,245,237 A | 9/1993 | Fisher et al. | |
| 5,315,195 A | 5/1994 | Bradfield et al. | |
| 5,451,823 A | 9/1995 | Deverall et al. | |
| 5,714,824 A | 2/1998 | Couture et al. | |
| 5,744,892 A | 4/1998 | Mukai et al. | |
| 5,780,953 A | 7/1998 | Umeda et al. | |
| 5,977,669 A | 11/1999 | Yoshida et al. | |
| 6,150,741 A | 11/2000 | Hayashi et al. | |
| 6,201,332 B1 * | 3/2001 | Umeda | H02K 3/12 310/179 |
| 6,281,614 B1 * | 8/2001 | Hill | H02K 3/12 310/201 |
| 6,317,962 B1 | 11/2001 | Adachi et al. | |
| 6,337,529 B1 | 1/2002 | Higashino et al. | |
| 6,376,961 B2 | 4/2002 | Murakami et al. | |
| 6,484,388 B1 * | 11/2002 | Amlee | B23P 11/005 29/596 |
| 6,486,580 B1 | 11/2002 | Cenzer et al. | |
| 6,507,137 B2 | 1/2003 | Asao et al. | |
| 6,657,338 B2 | 12/2003 | Fisher et al. | |
| 6,664,674 B2 | 12/2003 | Ihata | |
| 6,664,703 B2 | 12/2003 | Oketani et al. | |
| 6,742,238 B2 | 6/2004 | Lee | |
| 6,750,582 B1 * | 6/2004 | Neet | H02K 3/24 310/201 |
| 6,754,946 B2 | 6/2004 | Nguyen | |
| 6,774,518 B2 | 8/2004 | Howe et al. | |
| 6,787,961 B2 | 9/2004 | Neet et al. | |
| 6,819,024 B1 | 11/2004 | Fujita et al. | |
| 6,831,382 B1 | 12/2004 | Lyle et al. | |
| 6,858,963 B2 | 2/2005 | Neet | |
| 6,882,077 B2 * | 4/2005 | Neet | H02K 3/12 310/201 |
| 6,885,127 B1 | 4/2005 | Higashino et al. | |
| 6,886,236 B2 | 5/2005 | Higashino et al. | |
| 6,930,426 B2 | 8/2005 | Neet et al. | |
| 7,042,129 B2 * | 5/2006 | Neet | H02K 3/345 310/208 |
| 7,132,775 B2 | 11/2006 | Oohashi et al. | |
| 7,143,501 B2 | 12/2006 | Bramson et al. | |
| 7,217,106 B2 | 5/2007 | Tanaka et al. | |
| 7,234,226 B2 | 6/2007 | Fujita et al. | |
| 7,281,312 B2 | 10/2007 | Sadiku et al. | |
| 7,282,830 B2 | 10/2007 | Harrer et al. | |
| 7,345,391 B2 | 3/2008 | Bradfield et al. | |
| 7,352,091 B2 | 4/2008 | Bradfield | |
| 7,417,344 B2 | 8/2008 | Bradfield | |
| 7,546,672 B2 | 6/2009 | Murase | |
| 7,589,441 B2 | 9/2009 | Kalsi et al. | |
| 7,600,311 B2 | 10/2009 | Kreuzer et al. | |
| 7,687,954 B2 * | 3/2010 | Neet | H02K 19/24 310/263 |
| 7,827,672 B2 | 11/2010 | Asao | |
| 8,519,577 B2 | 8/2013 | Stiesdal | |
| 2003/0233748 A1 | 12/2003 | Gorohata et al. | |
| 2004/0239190 A1 | 12/2004 | Rau et al. | |
| 2005/0006975 A1 | 1/2005 | Bradfield et al. | |
| 2005/0046299 A1 | 3/2005 | Brown et al. | |
| 2007/0216253 A1 | 9/2007 | Shendi | |
| 2009/0001841 A1 | 1/2009 | Naganawa et al. | |
| 2009/0260217 A1 | 10/2009 | Kamakura et al. | |
| 2010/0066198 A1 | 3/2010 | Fubuki et al. | |
| 2010/0077599 A1 | 4/2010 | Tokizawa | |
| 2010/0295390 A1 | 11/2010 | Rau et al. | |
| 2011/0043059 A1 | 2/2011 | Wolf et al. | |
| 2011/0095639 A1 | 4/2011 | Nakamura | |

FOREIGN PATENT DOCUMENTS

| | | |
|---|---|---|
| JP | 1169721 A | 3/1999 |
| JP | 2011151933 A | 8/2011 |
| KR | 1020100070147 A | 6/2010 |

OTHER PUBLICATIONS

International Search Report and Written Opinion for PCT Application No. PCT/US2012/064753, dated Mar. 15, 2013, pp. 1-10.
International Search Report and Written Opinion for PCT Application No. PCT/US2012/064598, dated Mar. 18, 2013, pp. 1-10.
International Search Report and Written Opinion for PCT Application No. PCT/US2012/064947, dated Mar. 28, 2013, pp. 1-12.

\* cited by examiner

METHOD OF WINDING A STATOR CORE WITH A CONTINUOUS CONDUCTOR HAVING A RECTANGULAR CROSS-SECTION AND A STATOR CORE

CROSS-REFERENCE TO RELATED APPLICATION

This application is a continuation-in-part of U.S. application Ser. No. 13/298,813 filed Nov. 17, 2011, the disclosure of which is incorporated by reference herein its entirety.

BACKGROUND OF THE INVENTION

Exemplary embodiments pertain to the art of electric machines and, more particularly, to a method of winding a stator core with a continuous conductor having a rectangular cross-section.

At present, many electric machines include stator cores that are wound with wire having a circular cross-section. The stator core is held stationary and the wire is fed through a winding needle that is rotated about a stator tooth. Once the stator tooth is wound, the wire is advanced to a subsequent stator tooth. At each tooth, the winding needle not only travels along a circular path but also moves in and out to layer the wire. Upon exiting the winding needle, the wire twists as a result of rotational forces developed while traveling along the circular path.

In other cases, the stator core is wound with wire having a rectangular cross-section. A continuous wire is laid into slot segments formed in the stator core. In this manner, the wire is not subjected to twisting. The use of rectangular wire increases a fill volume of the slot segments which, in turn, enhances electrical properties of the stator. Electrical properties of the stator are further enhanced by adding tooth elements to the slot segments. The tooth elements reduce torque ripples during start-up of the electric machine. However, the tooth elements also create a localized narrowing of the slot segments. The localized narrowing precludes the use of a continuous wire having a rectangular cross-section. In such cases, the wire is formed into discrete sections, or hairpins, that are axially inserted into the slot segments. Once all sections are inserted, select ones of the sections are joined to form one or more phase windings for the stator.

BRIEF DESCRIPTION OF THE INVENTION

Disclosed is a method of inserting a continuous conductor having a rectangular cross-section into slot segments formed in a stator core includes forming a core member extending from a first end portion to a second end portion and a plurality of slot segments each having an opening and inserting a stator winding having a plurality of phases into select ones of the slot segments. Each of the plurality of phases has at least one conductor including a plurality of substantially straight segments alternately connected by a plurality of end loop segments. A section of at least one conductor includes three consecutive end loop segments and three consecutive straight segments formed from a single continuous conductor. The method further includes narrowing the opening of each of the plurality of slot segments by forming an annular stator core having a central axis. The three consecutive straight segments are substantially similarly radially spaced from the central axis.

Also disclosed is a stator core including a core member having a first end portion that extends to a second end portion through a first surface and an opposing second surface. The core member includes a first axial end, a second axial end and a central axis. A plurality of slot segments is formed in the core member. Each of the plurality of slot segments includes first and second wall portions spaced one from another to define a first width of the plurality of slot segments. Each of the first wall portions includes a first end portion, a second end portion, and a tooth element arranged at the second end portion, and each of the second wall portions includes a first end section, a second end section, and a tooth member at the second end section. The tooth element on each first wall portion extends toward the tooth member on each second wall portion to define a second width of the slot segment. The stator core also includes a stator winding having a plurality of phases. Each of the plurality of phases has at least one conductor including a plurality of substantially straight segments disposed in select ones of the plurality of slot segments. The straight segments are alternately connected at the first and second axial ends of the core member by a plurality of end loop segments. A section of the at least one conductor includes three consecutive end loop segments and three consecutive straight segments formed from a single continuous conductor. The three consecutive straight segments are substantially similarly radially spaced from the central axis.

Further disclosed is an electric machine including a housing, a rotor rotatably supported within the housing, and a stator fixedly mounted relative to the rotor. The stator includes a stator core including a core member having a first end portion that extends to a second end portion through a first surface and an opposing, second surface, the core member including a central axis, a first axial end and a second axial end. A plurality of slot segments is formed in the core member. Each of the plurality of slot segments includes first and second wall portions spaced one from another to define a first width of the plurality of slot segments. Each of the first wall portions includes a first end portion, a second end portion and a tooth element arranged at the second end portion, and each of the second wall portions includes a first end section, a second end section, and a tooth member at the second end section. The tooth element on each first wall portion extends toward the tooth member on each second wall portion to define a second width of the slot segment. The stator core further includes a stator winding having a plurality of phases. Each of the plurality of phases has at least one conductor including a plurality of substantially straight segments disposed in select ones of the plurality of slot segments. The straight segments are alternately connected at the first and second axial ends of the core member by a plurality of end loop segments. A section of the at least one conductor includes three consecutive end loop segments and three straight segments formed from a single continuous conductor. The three consecutive straight segments are substantially similarly radially spaced from the central axis.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
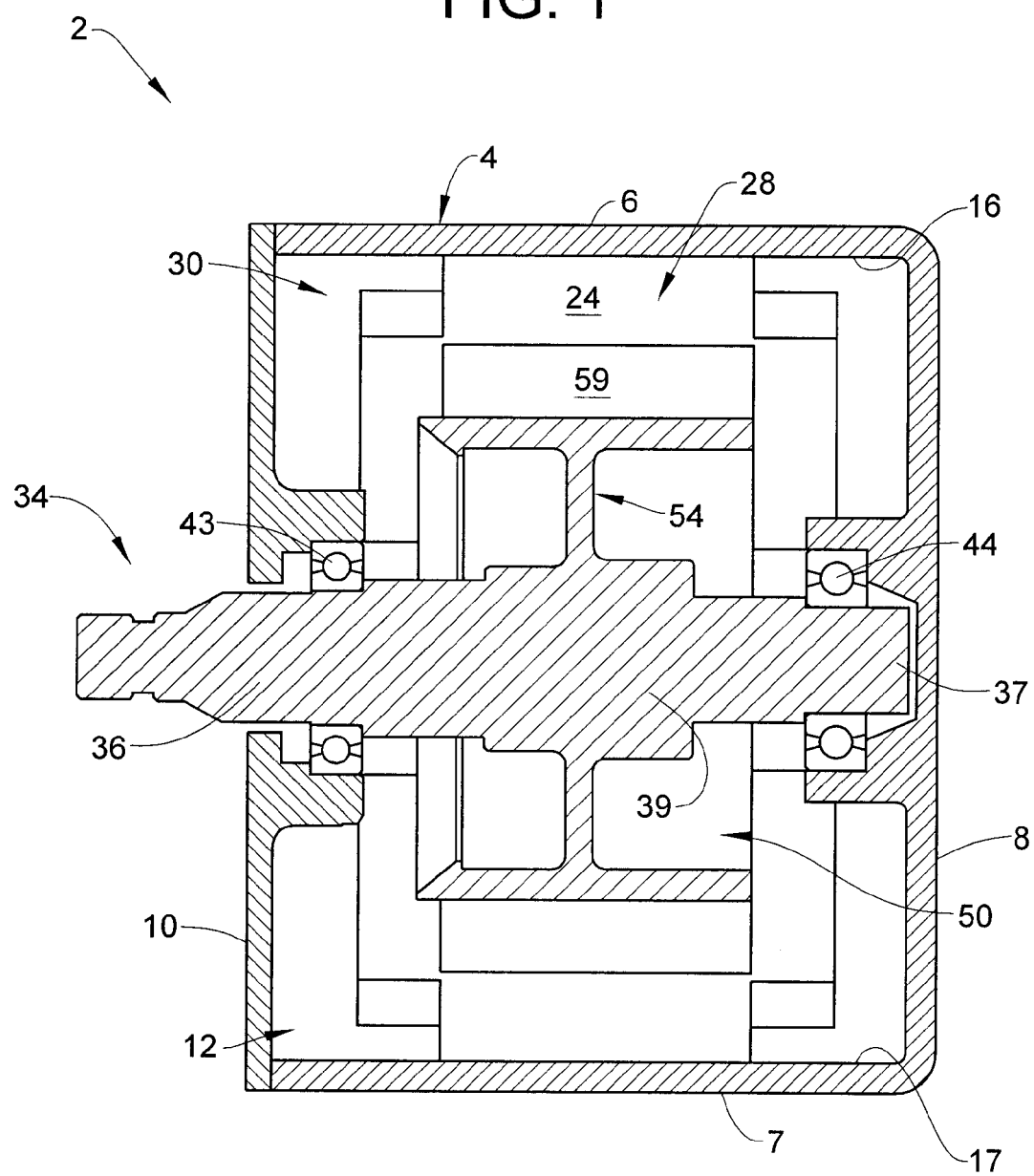
FIG. 1 depicts a cross-sectional view of an electric machine including a stator core, in accordance with an exemplary embodiment.

An electric machine, in accordance with an exemplary embodiment, is indicated generally at 2, in FIG. 1. Electric machine 2 includes a housing 4 having first and second side walls 6 and 7 that are joined by a first end wall 8 and a second end wall or cover 10 to collectively define an interior portion 12. First side wall 6 includes an inner surface 16 and second side wall 7 includes an inner surface 17. At this point it should be understood that housing 4 could also be constructed to include a single side wall having a continuous inner surface. Electric machine 2 is further shown to include a stator 24 arranged at inner surfaces 16 and 17 of first and second side walls 6 and 7. Stator 24 includes an annular stator core 28 which, as will be discussed more fully below, supports a plurality of stator windings 30.

Electric machine 2 is also shown to include a shaft 34 rotatably supported within housing 4. Shaft 34 includes a first end 36 that extends to a second end 37 through an intermediate portion 39. First end 36 is rotatably supported relative to second end wall 10 through a first bearing 43 and second end 37 is rotatably supported relative to first end wall 8 through a second bearing 44. Shaft 34 supports a rotor assembly 50 that is rotatably mounted within housing 4. Rotor assembly 50 includes a rotor hub 54 that is fixed relative to intermediate portion 39 of shaft 34, and a rotor lamination 59 that is configured to rotate relative to stator 24.

Figure 2:
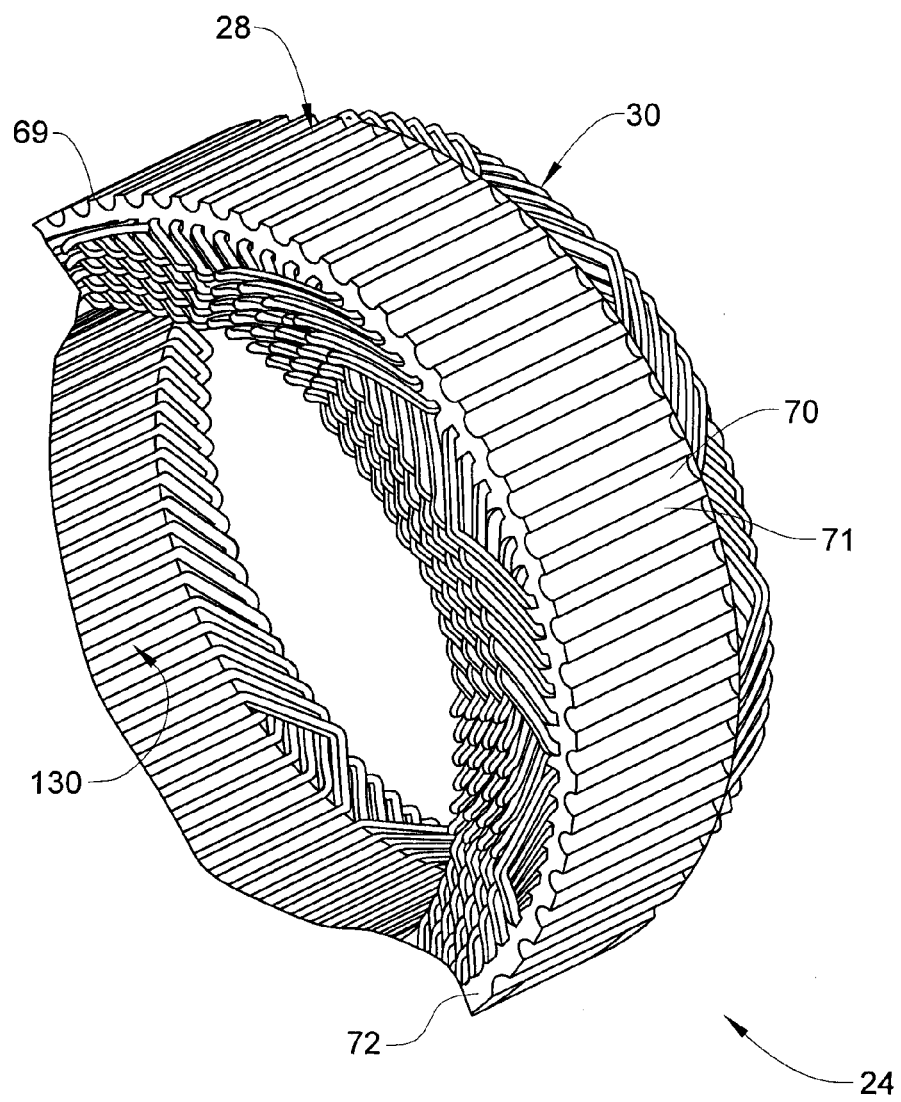
FIG. 2 depicts a perspective view of the stator core of FIG. 1.
Figure 3:
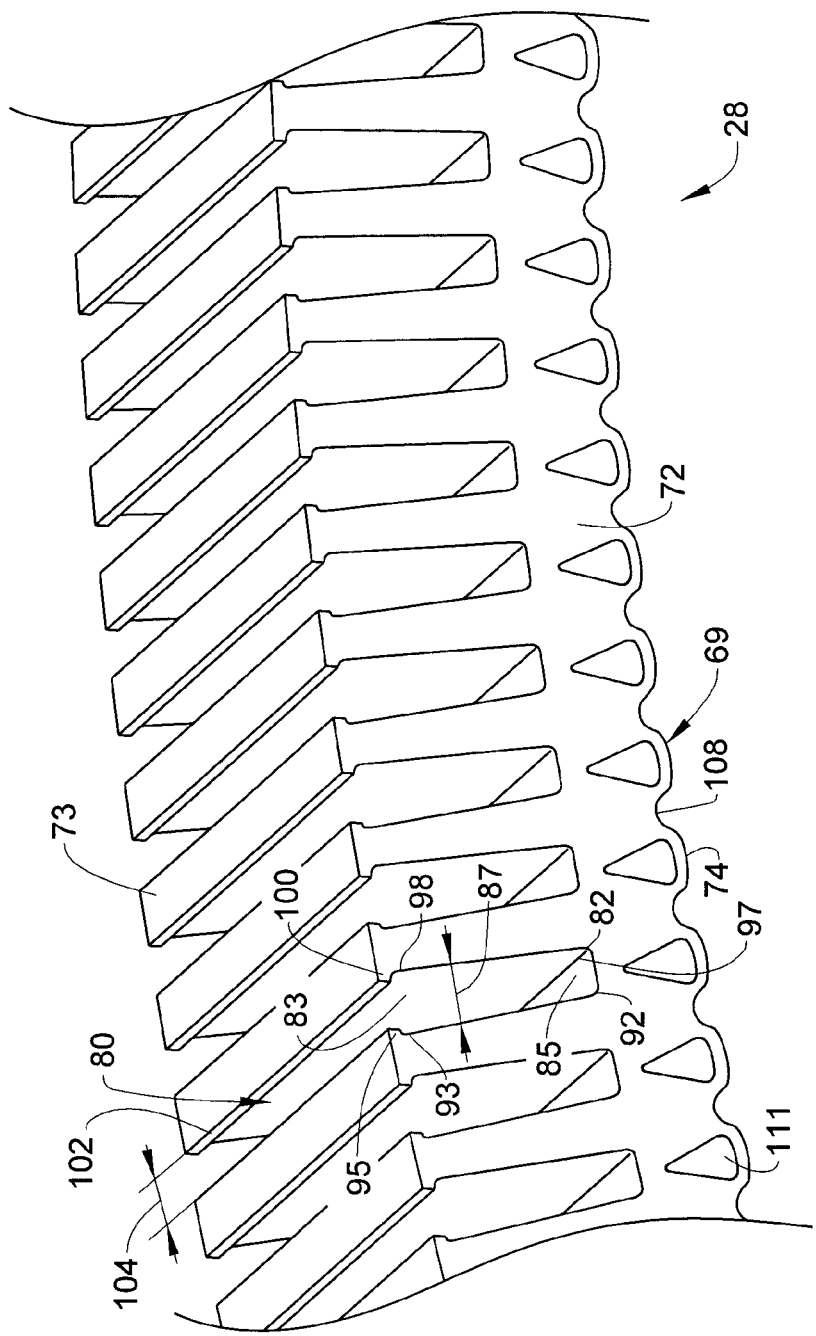
FIG. 3 depicts a perspective view of a stator core member prior to insertion of stator windings, in accordance with an exemplary embodiment.

As best shown in FIGS. 2 and -3, stator core 28 is formed from a core member 69 having a first end 70 that extends to a second end 71 through an intermediate portion 72. Intermediate portion 72 includes a first surface 73 and an opposing, second surface 74. In the exemplary embodiment shown, core member 69 includes a plurality of slot segments, one of which is indicated at 80, that receive stator windings 30, as will be detailed more fully below. Each slot segment 80 includes a first wall portion 82 and an opposing, second wall portion 83 that are separated by a base portion 85 which establishes a first width 87. First wall portion 82 includes a first end portion 92 that extends from base portion 85 to a second end portion 93. Second end portion 93 includes a tooth element 95.

Similarly, second wall portion 83 includes a first end section 97 that extends from base portion 85 to a second end section 98. Second end section 98 includes a tooth member 100. Tooth member 100 is spaced from tooth element 95 to establish an opening 102 having a second width 104 of slot segment 80. Tooth member 100 and tooth element 95 are positioned on stator core 28 so as to reduce torque ripple effects associated with starts and stops of electric machine 2. Core member 69 is also shown to include a plurality of recesses 108 formed in second surface 74 as well as a plurality of cooling passages, one of which is shown at 111. Recesses 108 provide flexibility to core member 69 that allows the insertion of a number of continuous conductors 114-119 into slot segments 80. Continuous conductors 114-119 collectively define stator windings 30. Of course it should be understood that the number of continuous conductors may vary.

Figure 4:
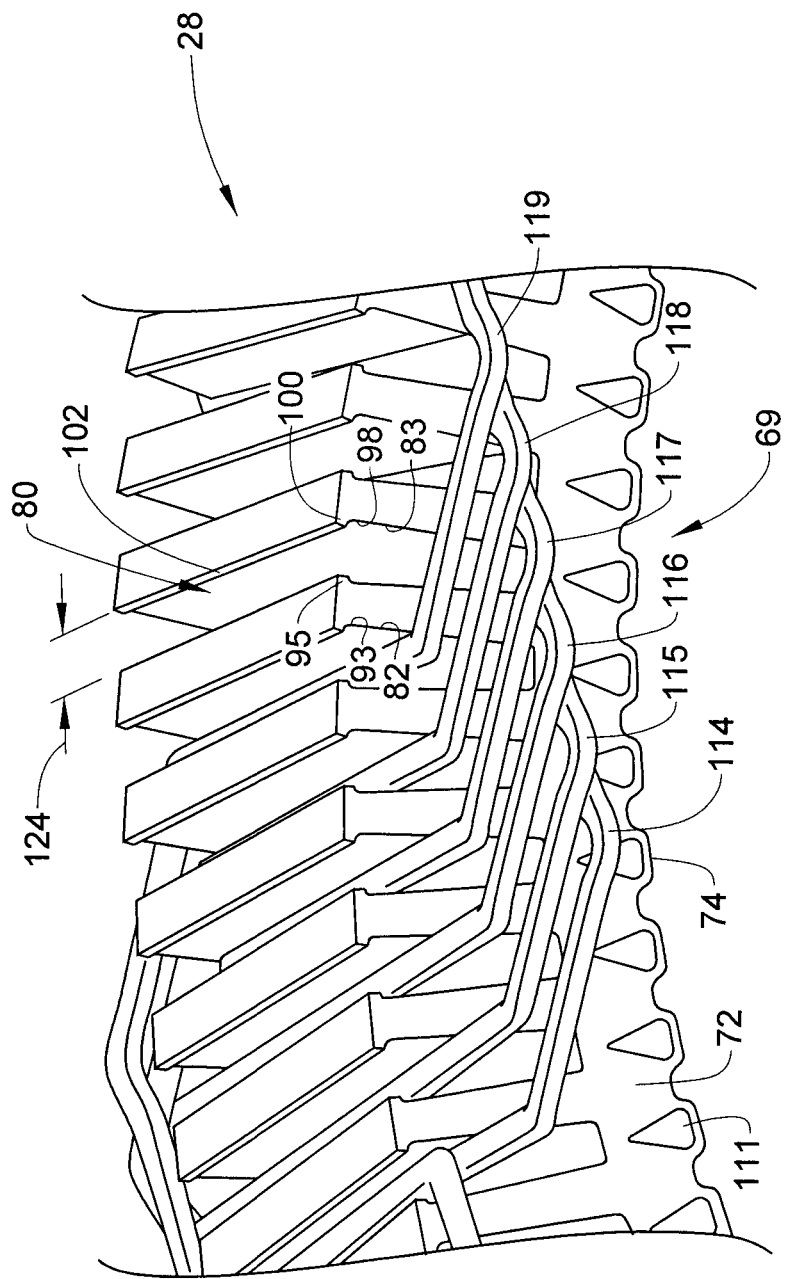
FIG. 4 depicts a perspective view of the stator core member of FIG. 3 receiving stator windings, in accordance with an exemplary embodiment.
Figure 5:
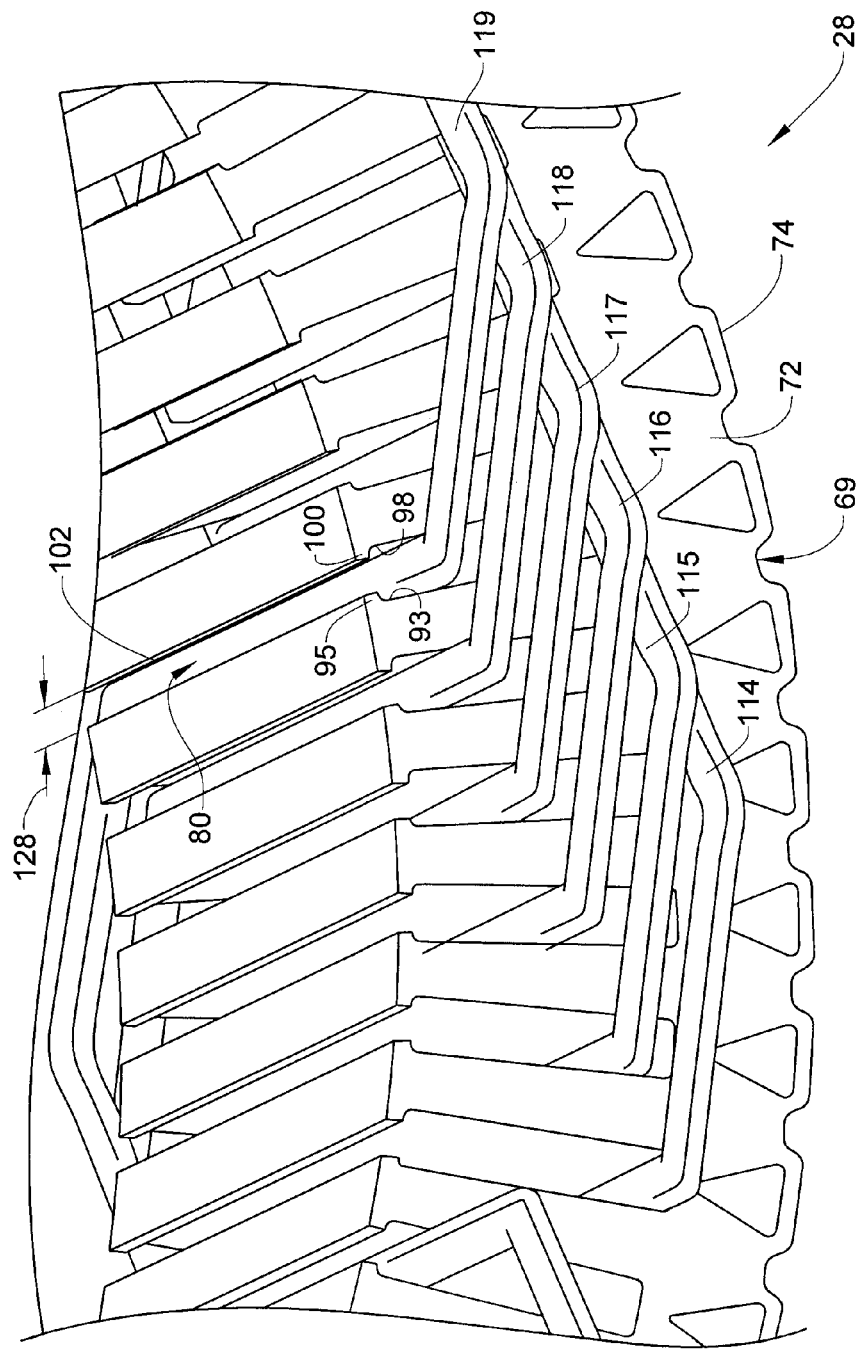
FIG. 5 depicts a perspective view of the stator core member following insertion of the stator windings, in accordance with an exemplary embodiment.

In accordance with the exemplary embodiment, continuous conductors 114-119 have a rectangular cross-section that is larger than second width 104. Therefore, in order to insert continuous conductors 114-119 into slot segments 80, second width 104 is temporarily widened. As best shown in FIG. 4, prior to inserting continuous conductors 114-119, core member 69 is deformed in a first direction causing each opening 102 to widen to a third width 124. More specifically, core member 69 is deformed such that first surface 73 has a generally convex curvature and second surface 74 has a generally concave curvature. At this point, continuous conductors 114-119 are installed into select ones of the plurality of slot segments 80 to establish stator windings 30. Once all conductors are inserted, core member 69 is deformed in a second direction, opposite to the first direction causing opening 102 to narrow to a fourth width 128 that is smaller than second width 104, such as shown in FIG. 5. More specifically, core member 69 is deformed so as to cause first end 70 to contact second end 71 to form an annular ring 130 (FIG. 2). First end 70 is secured to second end 71 through, for example, welding, and select ones of continuous conductors 114-119 are interconnected to establish a desired wiring configuration for stator windings 30 and complete stator core 28.

Figure 6:
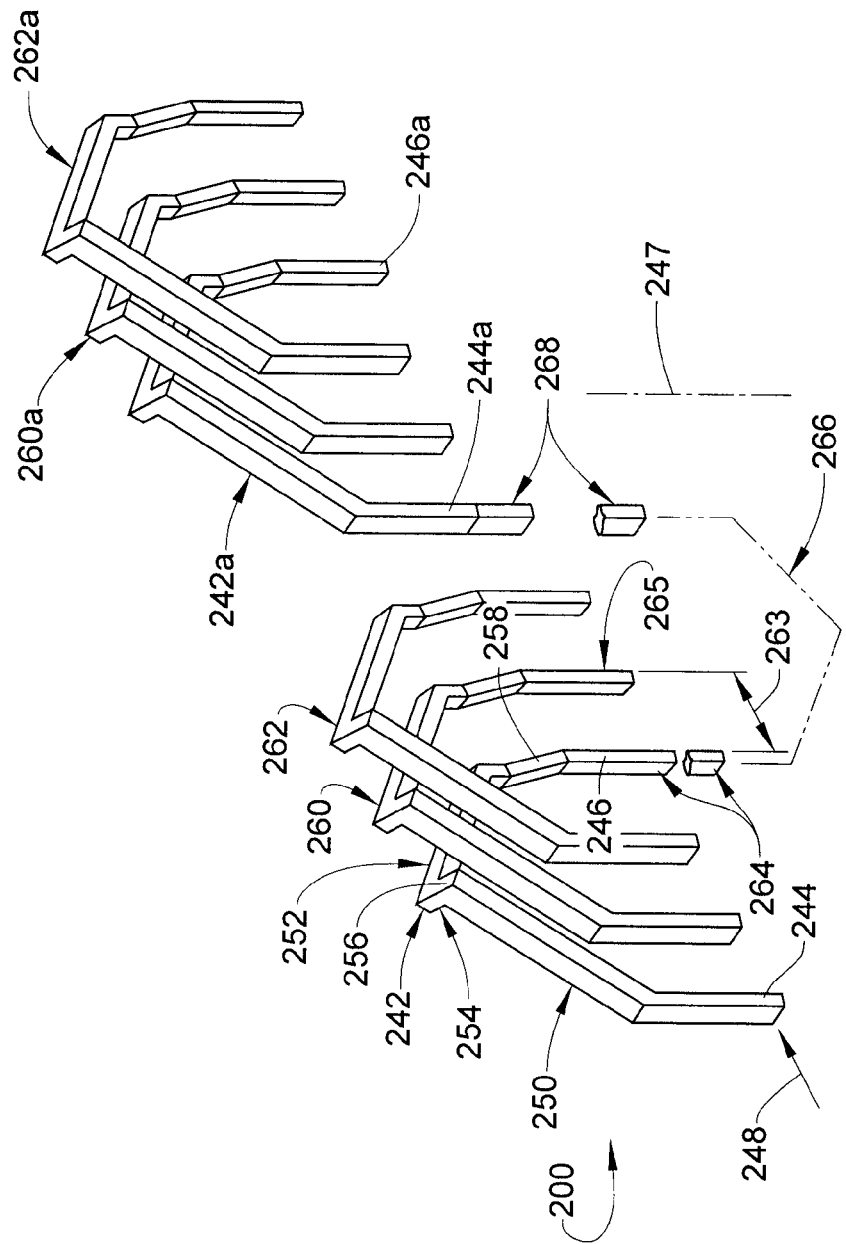
FIG. 6 depicts a fragmentary perspective view of a layer of end loop segments of a stator winding, in accordance with another aspect of an exemplary embodiment.
Figure 7:
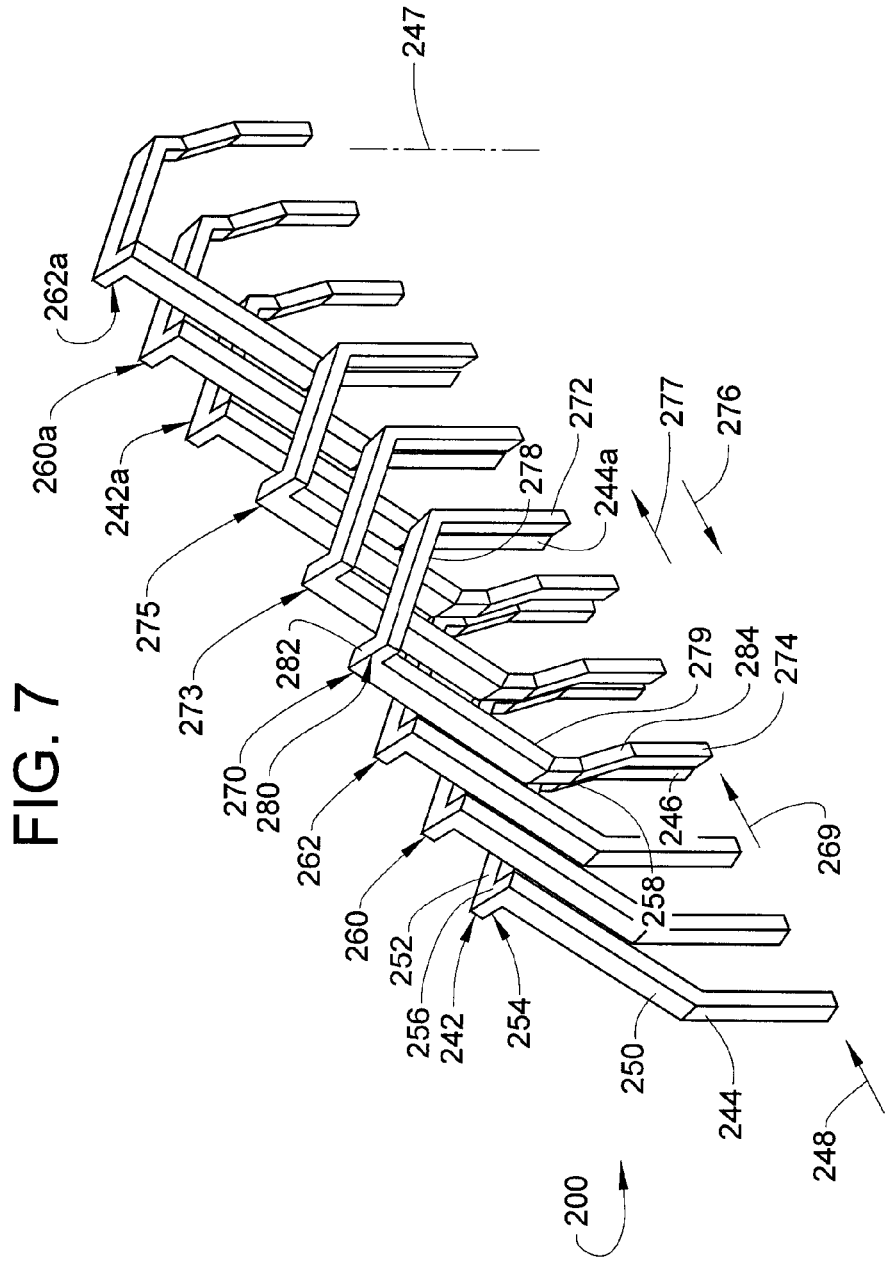
FIG. 7 depicts a perspective view of a plurality of layers of end loop segments of FIG. 6.
Figure 8:
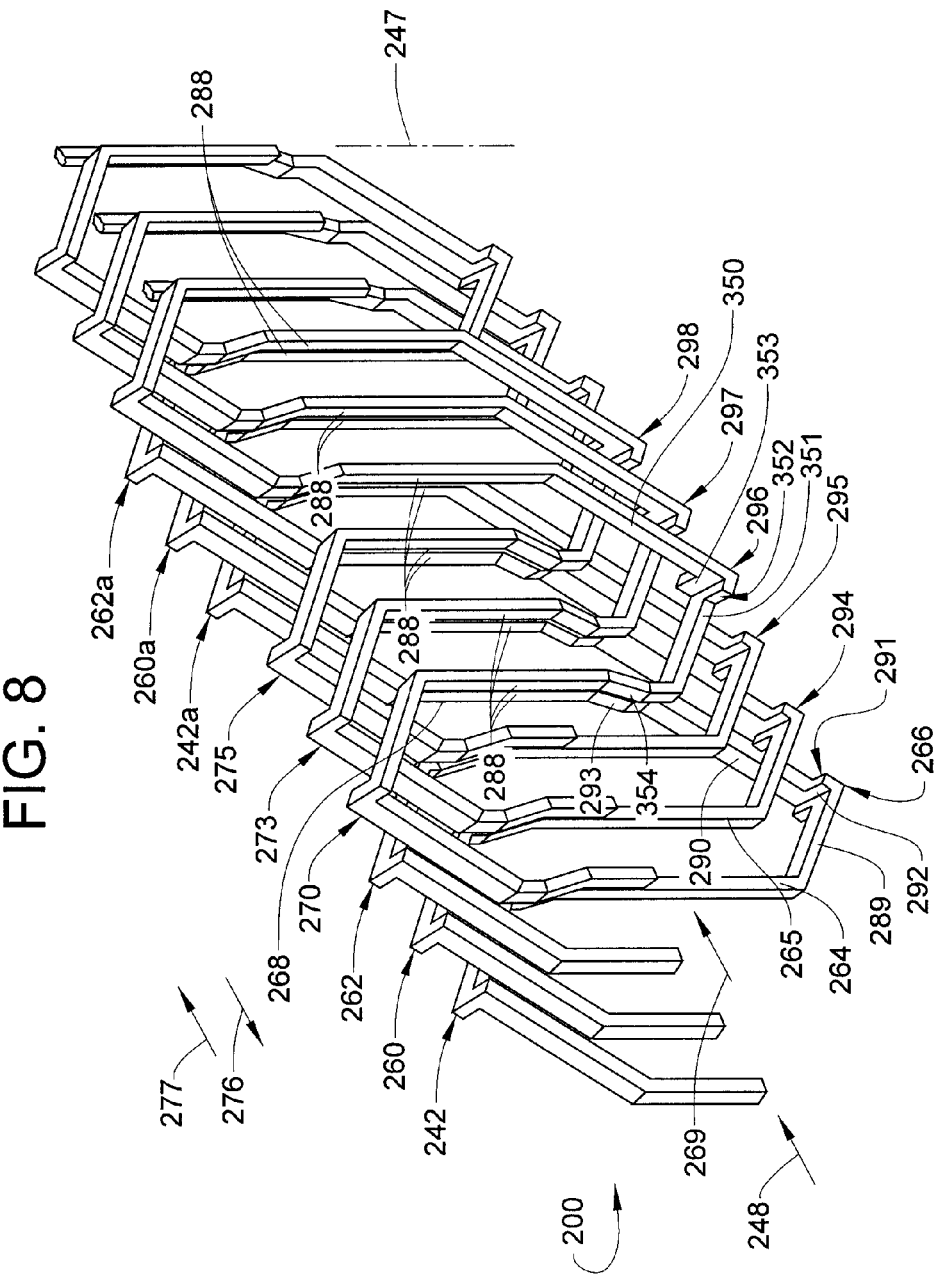
FIG. 8 depicts a perspective view of a plurality of layers of end loop segments of FIG. 7 having a plurality of straight segments and a plurality of end loop segments.

Reference will now follow to FIGS. 6-8 in describing a stator winding 200 in accordance with another aspect of an exemplary embodiment. Stator winding 200 includes an end loop segment 242 including a first substantially straight end portion 244 and a second substantially straight end portion 246 that are each proximate to a respective straight segment, discussed in more detail below. First end portion 244 and second end portion 246 of the end loop segment 242 are at a same substantial radial distance from a central axis 247 (FIG. 9) of the stator core 48 and therefore will be in the same radial position. Two straight segments connected to end portions 244 and 246 will therefore also be at substantially the same radial distance from central axis 247 of stator core 48 and will therefore be housed in the same radial position. The radial position is determined to be the position of the straight segment with respect to the other straight segments in a core slot. For example, in one core slot, the outermost straight portion is considered to be housed in the outermost radial position, the second outermost straight portion is considered to be housed in the second outermost radial position and so forth. The radial position of a straight segment is a relative position and not a distance. First end portion 244 and second end portion 246 form a portion of a layer, indicated generally at 248, of the stator winding 200 whose straight segments are in a same radial distance (and radial position) from the central axis 247 of stator core 48.

End loop segment 242 includes a first sloped portion 250 and a second sloped portion 252 that meet at an apex portion 254. First sloped portion 250 is substantially co-radial with the layer 248, first end portion 244 and second end portion 246. Second sloped portion 252 is substantially non-co-radial with the layer 248, first end portion 244 and second end portion 246. Apex portion 254 includes a first radial extension portion 256. First radial extension portion 256 extends from first sloped portion 250 in a radially outward direction, which provides a radial outward adjustment for end loop segment 242. A second sloping radial extension portion 258 connects second sloped portion 252 and second end portion 246. Second radial extension portion 258 extends from second sloped portion 252 in a radially inward direction, which provides a radial inward adjustment for the end loop segment 242. While the end loop segment 242 has been shown wherein the radial outward adjustment is adjacent apex portion 254 and the radial inward adjustment is adjacent second sloped portion 252, those skilled in the art can appreciate that the radial outward and inward adjustments can be on any one, or on any two, of first sloped portion 250, second sloped portion 252, and apex portion 254 in order to provide a cascaded winding pattern, described in more detail below.

End loop segment 242 is shown adjacent a plurality of substantially identical end loop segments, indicated generally at 260 and 262. End loop segments 242, 260, and 262 form a portion of stator winding 200. End loop segments 242, 260, and 262 are shown in a three-phase winding pattern but those skilled in the art will appreciate that the end loop segments 242, 260, and 262 may be formed in, for example, a six-phase winding pattern, or any other winding pattern advantageous for producing electricity or for generating torque, as in the case of an electric machine. End loop segments 242, 260, and 262 are preferably each disposed at a first axial end 263 of stator core 48.

Second end portion 246 attaches to a first straight segment, shown schematically at 264, which extends through one of slot segments 80 to second axial end (not separately labeled) of stator core 48. As first straight segment 264 exits the second end, first straight segment 264 is attached to an end of another end loop segment, shown schematically at 266, which is substantially identical to end loop segments 242, 260, and 262. End loop segment 266 is attached at another end (not shown) to a second straight segment, shown schematically at 268. Second straight segment 268 extends upwardly through another one of the slot segments 80 of stator core 48 and attaches to a portion 244a of an end loop segment 242a, which is substantially identical to the end loop segments 242, 260, and 262. End loop segments 242, 266 and 242a are considered as three consecutive end loop segments because end loop segments 242 and 266 are connected to the same straight segment 264 and end loop segments 266 and 242a are connected to the same straight loop segment 268. Straight segments 264 and 268 are considered consecutive straight segments because straight segment 264 is connected to end loop segment 266, which is also connected to straight segment 268. Similarly, a portion 246a of end loop segment 242a connects to another straight segment, discussed in more detail below. The pattern of connecting end loop segments 242, 266, and 242a and straight segments, such as the straight segments 264 and 268, as outlined above, continues throughout one substantial pass about a circumference of stator core 48 to form a first layer, such as layer 248, of a single phase of the stator winding 200.

End loop segment 242a is shown adjacent a plurality of substantially identical end loop segments, indicated generally at 260a and 262a. End loop segments 242a, 260a, and 262a are each connected to a corresponding plurality of straight segments, discussed in more detail below, such as the straight segments 264 and 268, which are each disposed in a respective slot segment 80 of the stator core 48. Straight segments 264 and 265 are attached to a plurality of end loop segments, discussed in more detail below, that are substantially identical to the end loop segments 260, 260a, 262, 262a, and 266. End loop segments 260, 260a, 262, and 262a, when attached to straight segments and end loop segments, each form a respective continuous first layer 248 of the phase of the complete stator winding 200 that is wound about stator core 48.

Preferably, each straight segment 264 and 268 and each end loop segment portion 242, 242a, 260, 260a, 262, 262a, and 266 are formed from a rectangular wire and have a cross-sectional shape having a substantially equal area, however, other shapes could also be employed such as round or square. For those skilled in the art, it is known that typical rectangular or square shaped conductors may include radii on the corners intermediate two adjacent edges.

Referring now to FIGS. 7 and 8, the first layer 248 of the end loop segments 242, 242a, 260, 260a, 262, 262a of FIG. 6, is shown with a second layer of end loop segments, indicated generally at 269. Second layer 269 is located radially inward of first layer 248 at a predetermined radial distance from layer 248. Second layer 269 includes a plurality of end loop segments, indicated generally at 270, 273, and 275. Together, layers 248 and 269 form a portion of stator winding, indicated generally at 200. The conductor of second layer 269 including end loop 270 is similar than that of the conductor of first layer 248 including end loop 242 except that it is inserted into the slot segments 80, shifted by n slots, discussed in more detail below, and it has end loop segments, such as the end loop segment 270, that extend radially outwardly in a counterclockwise direction 276, which is opposite the end loop segments, such as the end loop segment 242, of first layer 248, which extend radially outwardly in a clockwise direction 277.

End loop segment 270 includes a first sloped portion or non-co-radial portion 278 and a second sloped portion 279 connected by an apex portion 280. First sloped portion 278 is substantially co-radial with second layer 269, first end portion 272 and second end portion 274. Second sloped portion 279 is substantially non-co-radial with second layer 269, first end portion 272 and second end portion 274. Apex portion 280 includes a first radial extension portion 282. First radial extension portion 282 extends from first sloped portion 278 in a radially outward direction, which provides a radial outward adjustment for end loop segment 270. A second sloping radial extension portion 284 connects second sloped portion 279 and second end portion 274. Second radial extension portion 284 extends from second sloped portion 279 in a radially inward direction, which provides a radial inward adjustment for end loop segment 270.

As can best be seen in FIG. 7, the non-co-radial portion 278 of end loop segment 270 extends radially outward where it becomes substantially co-radial with first layer 248, first end portion 244 and second end portion 246, but because it is shifted by n slots, discussed in more detail below, non-co-radial portion 278 does not violate the space of end loop segments of first layer 248. This allows end loop segments of first and second layers 248 and 269 to cascade together forming a two layer winding 200, which extends radially outward by one wire width beyond first layer 248 but does not extend radially inward beyond innermost or second layer 269. For a winding with a plurality of layers, a third layer (not shown) which is substantially identical to the first layer 248, would have non-co-radial portions that would extend radially outward and be substantially co-radial with second layer 269 and therefore cascade with the second layer 269. For a pattern where the radial layers alternate between being substantially identical with first layer 248 and then second layer 269, a pattern develops where the winding only extends radially outward by one wire width of the outermost or first layer 248 but not radially inward of the innermost layer 269. This cascading effect allows a winding 200 with a plurality of layers to be inserted into a stator core, such as the stator core 48, that extend radially outwardly by one wire width while not extending radially inwardly. End loop segments 273 and 275 are substantially identical to end loop segment 270. The radial outward and inward adjustments for first and second layers 248 and 269 form a cascaded winding pattern shown in FIGS. 7 and 8.

Referring now to FIG. 8, first layer 248 and second layer 269 are shown with a plurality of straight segments 288, which are substantially identical to straight segments 264, 265, and 268. In accordance with an aspect of an exemplary embodiment, three consecutive straight segments 288 of first layer 269 are spaced substantially similarly radially from central axis 247 a first distance. Likewise, three consecutive end loop segments 288 of second layer 269 are spaced substantially similarly radially from central axis 247 a second distance. End loop segment 266 of FIG. 6 is shown having a first sloped portion 289 and a second sloped portion 290 connected by an apex portion 291. First sloped portion 289 is substantially co-radial with the first layer 248, and straight segments 264 and 268. Second sloped portion 290 is substantially non-co-radial with the first layer 248, and straight segments 264 and 268. Apex portion 291 includes a first radial extension portion 292. First radial extension portion 292 extends from first sloped portion 289 in a radially outward direction, which provides a radial outward adjustment for the end loop segment 266. A second sloping radial extension portion 293 connects second sloped portion 290 and straight segment 268. Second radial extension portion 293 extends from second sloped portion 290 in a radially inward direction, which provides a radial inward adjustment for the end loop segment 266. End loop segments 294 and 295 are substantially identical to the end loop segment 266.

Similarly, an end loop segment 296 of second layer 269 is shown adjacent the end loop segment 295 of first layer 248. End loop segment 296 includes a first sloped portion 350 and a second sloped portion 351 connected by an apex portion 352. First sloped portion 350 is substantially co-radial with second layer 269, and straight segments 288 of second layer 269. Second sloped portion 351 is substantially non-co-radial with second layer 269, and straight segments 288. Apex portion 352 includes a first radial extension portion 353. First radial extension portion 353 extends from first sloped portion 350 in a radially outward direction, which provides a radial outward adjustment for end loop segment 296. A second sloping radial extension portion 354 connects second sloped portion 351 and straight segment 288. Second radial extension portion 354 extends from second sloped portion 351 in a radially inward direction, which provides a radial inward adjustment for end loop segment 296. End loop segments 297 and 298 are substantially identical to the end loop segment 296.

Straight segments 264, 265, 268, and 288 of each phase of the stator winding 200 are preferably disposed in respective slot segments 80 at an equal pitch around the circumference of stator core 48. Specifically, a straight segment of a phase, such as straight segment 264, is disposed in a respective slot segment 80 adjacent straight segment 265 of the adjacent phase. The respective straight segments 264 and 265 are spaced apart by a circumferential distance or pitch 263, best seen in FIG. 6. Circumferential pitch 263 is substantially equal to a circumferential distance between a pair of adjacent slot segments 80 in stator core 48. Each of the straight segments and end loop segments of the phase including straight segment 264 remain disposed adjacent the respective straight segments and end loop segments of the phase including straight segment 264 at the same circumferential pitch 263 throughout the length of the stator winding 200 and throughout the circumference of stator core 48.

While straight segments 288 are shown generally coplanar in FIGS. 7 and 8 for illustrative purposes, straight segments 288 are preferably adapted to be received by a radially curved surface, such as an interior surface of stator core 48 and, therefore, are not coplanar (i.e., the circumferential first layer 248 is shown flattened in, for example, FIG. 7 but are co-radial). The width of each of straight segment 288, including any insulation, preferably fits closely to a width of slot segments 80, including any insulation.

Figure 9:
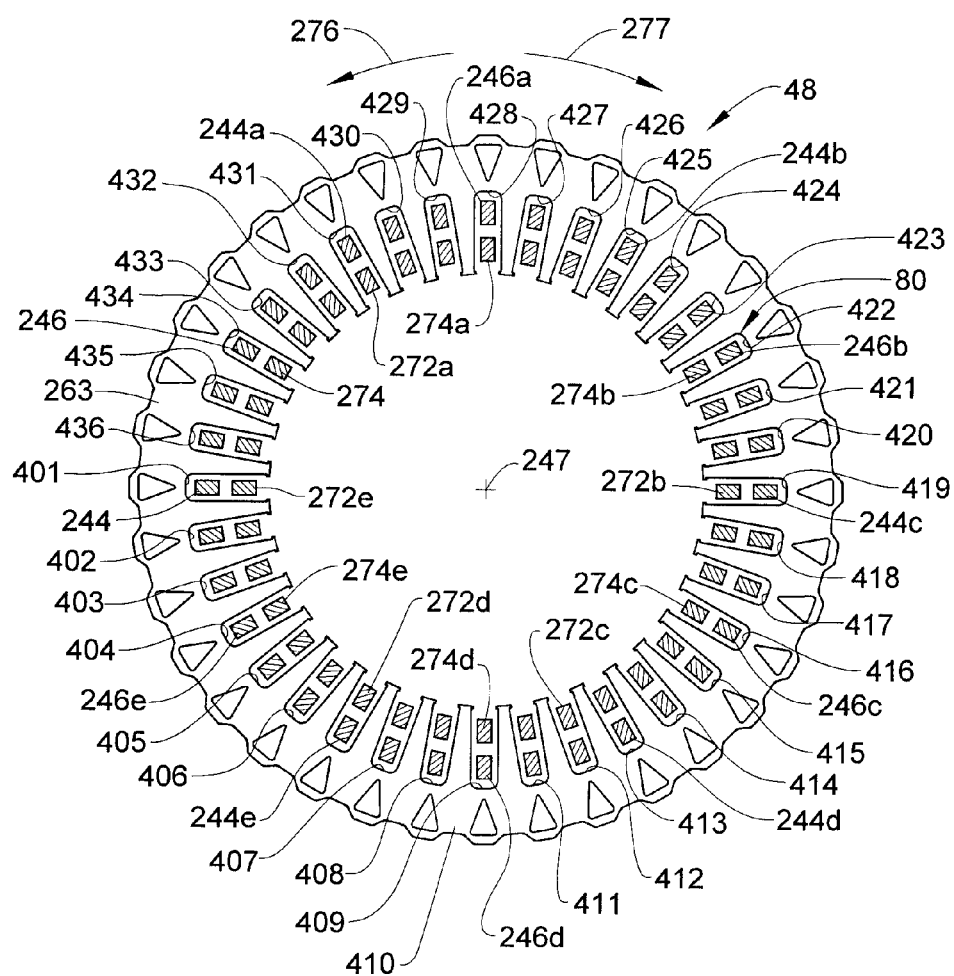
FIG. 9 depicts a schematic view of a stator core illustrating locations of the plurality of layers of the end loop segments of FIG. 8.

FIG. 9 depicts a plan schematic view of a stator core 48, in accordance with an aspect of an exemplary embodiment. The stator core 48 includes a total of thirty-six slot segments 80 numbered from 401 through 436 in increasing number in the circumferential counterclockwise direction 276. Stator winding 200 is adapted to be inserted in the slot segments 80 to form a stator winding, in accordance with the present invention as follows, where: n equals the number of phases in the stator winding 200. In FIG. 9, n=3.

When stator winding 200 is formed, a first lead (not shown) that connects to first end portion 244 is inserted into the second axial end (not separately labeled) of the stator core 48 in slot segment 401 and extends from the first axial end 263 of the stator core 48 in slot segment 401. The straight and portion 246 is located in slot segment 434 and end loop segment 242 connects first end portion 244 and straight end portion 246 at first axial end 263 of stator core 48. Straight end portion 246 connects to straight segment 264 in slot segment 434. Straight segment 264 extends through slot segment 434 and exits stator core 48 at slot segment 434, where it connects to the end loop segment 266. End loop segment 266 is substantially identical to end loop segment 242 except that it connects straight segment 264 exiting from slot segment 434 with straight segment 268 exiting from the slot segment 431 and is located on the second axial end of stator core 48.

The subsequent end loop segments alternate locations on the opposing axial ends of stator core 48 and connect straight portions in every nth slots. The straight portions of the end loop segments are located as follows: a straight portion 246*a* is located in slot segment 428, a straight portion 244*b* is located in slot segment 425, a straight portion 246*b* is located in slot segment 422, a straight portion 244*c* is located in slot segment 419, a straight portion 246*c* is located in slot segment 416, a straight portion 244*d* is located in slot segment 413, a straight portion 246*d* is located in slot segment 410, a straight portion 244*e* is located in slot segment 407, and a straight portion 246*e* is located in slot segment 404. Each of the straight portions 244-244e and 246-246e, together with the associated end loop segments, form a continuous conductor of one phase of the stator winding 200. Straight portion 246e extends from a second axial end (not separately labeled) of the stator core 48 as a second lead (not shown) and completes first layer 248 of the continuous phase. The first lead of the first layer 248, therefore, extends from slot segment 401 and the second lead of the phase extends from slot segment 404. Each of the first and second leads is located on the second axial end (not separately labeled) of the stator core 48.

Second layer 269 of the phase lays radially inward of first layer 248 and is shifted by n slots, such that the respective end loop segments are on the opposite axial ends of stator core 48 at the respective end loop segments of first layer 248.

A first lead that connects to second end portion 274 is inserted into the second axial end of stator core 48 in slot segment 434 and extends from the first axial end 263 of stator core 48 in slot segment 434. First end portion 272 is located in slot segment 431 and end loop segment 270 connects the first and second end portions 272 and 274 at the first axial end 263. First end portion 272 connects to a straight segment, such as the straight segment 288, in slot segment 431. Straight segment 288 extends through slot segment 431 and exits the second axial end of stator core 48 at slot segment 431, where it connects to an end loop segment, such as the end loop segment 296 of FIG. 8, that is substantially identical to the end loop segment 270 except that it connects the straight segments exiting from slot number 431 with another straight segment 288 exiting from slot segment 428 and is located on the second axial end of stator core 48.

Similar to first layer 248, the subsequent end loop segments alternate locations on first axial end 263 and the second axial end of stator core 48 and connect straight portions in every nth slots. The straight portions of the end loop segments are located as follows: a straight portion 274a is located in slot segment 428, a straight portion 272a is located in slot segment 425, a straight portion 274b is located in slot segment 422, a straight portion 272b is located in the slot segment 419, a straight portion 274c is located in slot segment 416, a straight portion 272c is located in slot segment 413, a straight portion 274d is located in slot segment 410, a straight portion 272d is located in slot segment 407, a straight portion 274e is located in slot segment 404, and a straight portion 272e is located in slot segment 401. Each of the straight portions 272-272e and 274-274e, together with the associated end loop segments, form a continuous phase of the stator winding 200. The straight portion 272e extends from the second axial end of stator core 48 as a second lead (not shown) and completes second layer 269 of the continuous phase. The first lead of second layer 269, therefore, extends from slot segment 434 and the second lead of the phase extends from slot segment 401. Each of the first and second leads is located on the second axial end of stator core 48. Preferably, the first and second leads of first and second layers 248 and 269 are connected to a rectifier (not shown), for supplying DC power to an automotive battery (not shown).

Each of the respective end loop segments 242, 260, 262, 266, 270, 273, 275, 294, 295, 296, 297, and 298 of the conductors of the stator winding 200 are cascaded, meaning that for each pass around the stator core 48, each of the conductors can be inserted into the stator core 48 in a sequential order. For example, the conductor including end loop segment 242 is inserted for one substantial revolution about the circumference of stator core 48. After the conductor including end loop segment 242 is inserted, the conductor including end loop segment 260 may be inserted for one substantial revolution about the circumference of stator core 48. This pattern is repeated for the conductor including the end loop segment 262. As seen in FIG. 8, when the conductors are inserted in this manner, the entirety of each of the continuous conductors may be wound about the circumference of stator core 48 without interfering with any of the other conductors. Preferably, the conductors of the first and second layers 248 and 269 are aligned in one radial row in each slot segment 80.

The conductor including end loop segment 242 of first layer 248, and the conductor including end loop segment 270 of second layer 269, include straight segments which coexist in the same slot segments, as can best be seen in FIG. 7. Therefore, these two conductors are the conductors of one phase. Furthermore, because each conductor passes circumferentially once around stator core 48, the phase of a winding with first and second layers 248 and 269 is comprised of two conductors, each passing once circumferentially around stator core 48. Similarly, the two conductors including end loop segments 260 and 273 coexist as a second phase and the conductors including end loop segments 262 and 275 coexist as a third phase, best seen in FIG. 7.

Alternatively, first and second layers 248 and 269 of one particular phase are formed from one single continuous conductor. The phase winds around the stator core 48, alternating end loop segments with straight segments in predetermined slot segments 80, in one circumferential direction as the radially outer or first layer 248 of stator winding 200 and then reverses direction and winds around stator core 48 in the opposite circumferential direction as the radially inner or second layer 269 of stator winding 200. When first straight portion 246e extends from first axial end 263, instead of extending from stator core 48 as a second lead, it extends radially inwardly and connects to an end loop segment, which enters slot number 401 in the radially inward or second layer 269 to connect to the straight portion 272e.

While the stator winding has been shown and described as a three phase stator winding, those skilled in the art, however, will appreciate that the stator winding could be formed as a six phase winding or any other pattern advantageous for producing electrical power or for generating torque, as in the case of an electric motor.

Further, while the stator winding has been shown as having two layers and therefore two conductors in each slot segment, it is often desirable to have a stator winding with more layers, such as four, and more conductors in each slot. This can be achieved by installing a plurality of layers substantially identical to first layer and second layer and radially alternating the windings substantially identical to first layer with windings substantially identical with second layer, resulting in a plurality of layers and a plurality of conductors in each slot segment.

At this point it should be still further understood that the exemplary embodiment provides a stator core having slot segments loaded with continuous conductors having a rectangular cross-section. The stator core also includes tooth elements and tooth members that reduce a width of the slot segments to less than a width of the continuous conductors. The stator core is at least twice deformed prior to completion. More specifically, a core member is first deformed in a first direction to allow the insertion of the continuous conductors and then deformed in a second direction to establish a final geometry of the stator core.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A method of inserting a continuous conductor having a rectangular cross-section into slot segments formed in a stator core, the method comprising:
    forming a core member extending from a first end portion to a second end portion and a plurality of slot segments each having an opening;
    inserting a stator winding having a plurality of phases into select ones of the slot segments, each of the plurality of phases having at least one conductor including a plurality of substantially straight segments alternately connected by a plurality of end loop segments, wherein a section of the at least one conductor includes three consecutive end loop segments and three consecutive straight segments formed from a single continuous conductor; and
    narrowing the opening of each of the plurality of slot segments forming an annular stator core having a central axis, wherein the three consecutive straight segments are substantially similarly radially spaced from the central axis.

2. The method of claim 1, further comprising: joining the first end portion of the core member to the second end portion of the core member to form the annular stator core about the central axis.

3. The method of claim 1, further comprising: widening the opening of each of the plurality of slot segments by separating tooth elements provided on the end portions of the slot segments.

4. The method of claim 1, wherein forming the core member includes deforming the core member in a first direction establishing a convex curvilinear surface defined by end portions of the slot segments.

5. The method of claim 1, further comprising deforming the core member in a second direction to narrow the opening in each of the slot segments.

6. The method of claim 5, wherein deforming the core member in the second direction establishes a concave curvilinear surface defined by the end portions of the slot segments.

7. A stator core comprising:
    a core member having a first end portion that extends to a second end portion through a first surface and an opposing second surface, the core member including a first axial end, a second axial end and a central axis;
    a plurality of slot segments formed in the core member, each of the plurality of slot segments including first and second wall portions spaced one from another to define a first width of the plurality of slot segments, each of the first wall portions including a first end portion, a second end portion, and a tooth element arranged at the second end portion, and each of the second wall portions including a first end section, a second end section, and a tooth member at the second end section, the tooth element on each first wall portion extending toward the tooth member on each second wall portion to define a second width of the slot segment; and
    a stator winding having a plurality of phases, each of the plurality of phases having at least one conductor including a plurality of substantially straight segments disposed in select ones of the plurality of slot segments, the straight segments being alternately connected at the first and second axial ends of the core member by a plurality of end loop segments, a section of the at least one conductors includes three consecutive end loop segments and three straight segments formed from a single continuous conductor, wherein the three consecutive straight segments are substantially similarly radially spaced from the central axis.

8. The stator core according to claim 7, wherein the first end portion is joined to the second end portion to define an annular stator core about the central axis.

9. The stator core according to claim 7, further comprising a plurality of recesses formed in the second surface.

10. The stator core according to claim 7, further comprising: a plurality of cooling passages extending through the core member.

11. An electric machine comprising:
    a housing;
    a rotor rotatably supported within the housing;
    a stator fixedly mounted relative to the rotor, the stator comprising:
        a stator core including a core member having a first end portion that extends to a second end portion through a first surface and an opposing, second surface, the core member including a central axis, a first axial end and a second axial end;
        a plurality of slot segments formed in the core member, each of the plurality of slot segments including first and second wall portions spaced one from another to define a first width of the plurality of slot segments, each of the first wall portions including a first end portion, a second end portion and a tooth element arranged at the second end portion, and each of the second wall portions including a first end section, a second end section, and a tooth member at the second end section, the tooth element on each first wall portion extending toward the tooth member on each second wall portion to define a second width of the slot segment; and
        a stator winding having a plurality of phases, each of the plurality of phases having at least one conductor including a plurality of substantially straight segments disposed in select ones of the plurality of slot segments, the straight segments being alternately connected at the first and second axial ends of the core member by a plurality of end loop segments, a section of the at least one conductor includes three consecutive end loop segments and three straight segments formed from a single continuous conductor, wherein the three consecutive straight segments are substantially similarly radially spaced from the central axis.

12. The electric machine according to claim 11, wherein the first end portion of the core member is joined to the second end portion of the core member to define an annular stator core about the central axis.

13. The electric machine according to claim 11, further comprising: a plurality of recesses formed in the second surface of the core member.

14. The electric machine according to claim 11, further comprising: a plurality of cooling passages formed in the core member.

* * * * *